US011500078B2

(12) United States Patent
Kawazoe

(10) Patent No.: US 11,500,078 B2
(45) Date of Patent: Nov. 15, 2022

(54) LASER RADAR DEVICE, LASER RADAR MEASUREMENT METHOD, LASER RADAR MEASUREMENT PROGRAM, AND TRAVELING BODY

(71) Applicant: MITSUBISHI HEAVY INDUSTRIES, LTD., Tokyo (JP)

(72) Inventor: Kohei Kawazoe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 430 days.

(21) Appl. No.: 16/781,252

(22) Filed: Feb. 4, 2020

(65) Prior Publication Data

US 2020/0363514 A1    Nov. 19, 2020

(30) Foreign Application Priority Data

May 17, 2019   (JP) .............................. JP2019-093372

(51) Int. Cl.
| G01S 7/497 | (2006.01) |
| G01S 17/894 | (2020.01) |
| G01S 7/481 | (2006.01) |
| G01S 17/931 | (2020.01) |

(52) U.S. Cl.
CPC ............ *G01S 7/497* (2013.01); *G01S 7/4816* (2013.01); *G01S 17/894* (2020.01); *G01S 17/931* (2020.01)

(58) Field of Classification Search
CPC ...... G01S 7/497; G01S 17/894; G01S 7/4816; G01S 17/931
See application file for complete search history.

(56) References Cited

U.S. PATENT DOCUMENTS

| 2017/0328992 A1* | 11/2017 | Baik ....................... G01S 7/497 |
| 2018/0038958 A1* | 2/2018 | Kawazoe ................ G01S 17/42 |
| 2019/0025409 A1 | 1/2019 | Kawazoe et al. |

FOREIGN PATENT DOCUMENTS

| JP | 2016-180624 | 10/2016 |
| JP | 2017-150990 | 8/2017 |

OTHER PUBLICATIONS

The Extended European Search Report dated Apr. 14, 2020 in corresponding EP application No. 20155723.8.

* cited by examiner

*Primary Examiner* — Jamil Ahmed
(74) *Attorney, Agent, or Firm* — Wenderoth, Lind & Ponack, L.L.P.

(57) ABSTRACT

A laser radar device includes a scanner unit for scanning a measurement target area along a second direction orthogonal to a predetermined first direction by irradiating the measurement target area with a line-shaped laser beam as a light-transmitting angle is changed, the line-shaped laser beam being a laser beam formed into a line shape so as to extend in the first direction, a received signal generation unit for generating a received signal according to received reflected light of the line-shaped laser beam, a storage unit for storing shape distortion information of the line-shaped laser beam in the second direction, and a three-dimensional information generation unit for generating three-dimensional information of the measurement target area based on corrected position information in the second direction obtained by correcting position information in the second direction calculated based on the received signal and the light-transmitting angle, with the shape distortion information.

9 Claims, 6 Drawing Sheets

LASER RADAR DEVICE, LASER RADAR MEASUREMENT METHOD, LASER RADAR MEASUREMENT PROGRAM, AND TRAVELING BODY

TECHNICAL FIELD

The present disclosure relates to a laser radar device for generating three-dimensional information of a measurement target area by scanning a laser beam, and a traveling body.

BACKGROUND

In general, a laser radar device is known which generates three-dimensional information of a measurement target area from the distribution of light-receiving signals obtained by irradiating the measurement target area with a laser beam while scanning the measurement target area with the laser beam and by receiving, with a light-receiving element, light reflected from an object or the like existing in the measurement target area. In the laser radar device of this type, a scanner is provided on each of a light-transmitting side of a laser beam and a light-receiving side of reflected light, and a mirror angle (light-receiving angle of the reflected light) of the scanner on the light-receiving side is adjusted as needed in accordance with a mirror angle (light-transmitting angle of the laser beam) of the scanner on the light-transmitting side at the time of scanning, thereby inputting the reflected light to the light-receiving element. In this configuration, the scanner is provided on each of the light-transmitting side and the light-receiving side. Thus, the problem arises in that the size of the entire laser radar device increases.

In order to solve the above-described problem, a laser radar device is proposed which can implement scanless by a simple configuration without providing any scanner on a light-receiving side (see Patent Document 1). The laser radar device includes a light-receiver lens, a line sensor array, and a light-receiver optical system. The light-receiver lens receives reflected light obtained when a laser beam formed into a line shape in the first direction is reflected from a measurement target area. The line sensor array is arranged downstream of the light-receiver lens and includes a plurality of line sensor cells disposed along the above-described first direction. The light-receiver optical system is arranged between the light-receiver lens and the line sensor array. The light-receiver optical system includes a light-receiver optical system for condensing the reflected light received by the light-receiver lens toward the line sensor array, and is configured such that a magnification at which the reflected light is condensed in the second direction is set higher than a magnification at which the reflected light is condensed in the first direction. Thus, it is possible to keep the entire measurement target area within a sensor field of view of the line sensor array, and to implement scanless on the light-receiving side with a simple configuration.

CITATION LIST

Patent Literature

Patent Document 1: JP2016-180624A

SUMMARY

In the laser radar device disclosed by Patent Document 1, it is presupposed that a laser beam formed into a line shape (to be referred to as a line-shaped laser beam hereinafter) has a linear shape and is parallel to a line sensor axis (for example, in the x-axis direction) when the measurement target area A is irradiated with the line-shaped laser beam. It is thus considered that a deviation occurs in position coordinates in a scanning direction of generated three-dimensional information in a case in which the irradiation axis of the line-shaped laser beam is oblique with respect to the line sensor axis, in a case in which a linear shape of the line-shaped laser beam is distorted such as curved (see FIG. 4 to be described later), or the like. In addition, the distorted shape such as the curved shape described above may vary from one light-transmitting angle (irradiation direction angle) of the line-shaped laser beam to another in a case in which there is a lens in the middle of irradiating the measurement target area with the line-shaped laser beam, for example.

In view of the above, an object of at least one embodiment of the present invention is to provide a laser radar device capable of generating three-dimensional information with higher accuracy.

(1) A laser radar device according to at least one embodiment of the present invention includes a scanner unit for scanning a measurement target area along a second direction orthogonal to a predetermined first direction by irradiating the measurement target area with a line-shaped a laser beam as a light-transmitting angle is changed, the line-shaped laser beam being a laser beam formed into a line shape so as to extend in the first direction, a received signal generation unit for generating a received signal according to received reflected light of the line-shaped laser beam with which the measurement target area is irradiated, a storage unit for storing shape distortion information of the line-shaped laser beam in the second direction, and a three-dimensional information generation unit for generating three-dimensional information of the measurement target area based on corrected position information in the second direction which is obtained by correcting position information in the second direction calculated based on the received signal and the light-transmitting angle, with the shape distortion information.

With the above configuration (1), the three-dimensional information of the measurement target area is generated based on the corrected position information in the second direction (for example, the Y direction), which is obtained by correcting, with the shape distortion information, the position information (assumed position information) in the second direction obtained by, for example, a geometric method or the like based on the light-transmitting angle, to the measurement target area, of the laser beam formed into the line shape (line-shaped laser beam) in the first direction (for example, the X direction) and the signal (received signal) of the reflected light from the reflection position of the measurement target area.

Thus, it is possible to accurately generate the three-dimensional information of the measurement target area by using the corrected position information in the second direction, even if a deviation from the assumed position occurs in a position of the shape of the line-shaped laser beam in the second direction when the measurement target area is irradiated with the line-shaped laser beam in a case in which the shape of the laser beam to be formed into the linear shape by a light-transmitter lens is not actually formed into the assumed linear shape but is distorted, or in a case in which the linear shape is inclined more than assumed due to the inclination of the irradiation axis of the laser beam, for example.

(2) In some embodiments, in the above configuration (1), the three-dimensional information generation unit includes a corrected position calculation unit for acquiring position information in the second direction of a reflection position of the reflected light from the measurement target area, which is calculated based on the light-transmitting angle and distance information of a distance to the reflection position, and a correction value according to the distance information and position information in the first direction of the reflection position, which is obtained based on the shape distortion information stored in the storage unit, and for calculating the corrected position information in the second direction based on the acquired position information in the second direction and the acquired correction value.

With the above configuration (2), the corrected position information in the second direction of the reflection position of the measurement target area is calculated by acquiring the position information (assumed position information) in the second direction of the reflection position, which is calculated based on the light-transmitting angle and the distance information of the distance to the reflection position, and the correction value determined in accordance with the distance information and the position information in the first direction of the reflection position. Thus, it is possible to obtain the corrected position information in the second direction.

(3) In some embodiments, in the above configuration (2), the laser radar device further includes a monitoring sensor for receiving the line-shaped laser beam, a branching device for branching the line-shaped laser beam to the monitoring sensor, the line-shaped laser beam being emitted from the scanner unit toward the measurement target area, and a shape distortion information generation unit for generating the shape distortion information based on a shape of the line-shaped laser beam received by the monitoring sensor.

With the above configuration (3), the shape information of the line-shaped laser beam is obtained by branching the actual line-shaped laser beam, with which the measurement target area is irradiated, to the monitoring sensor, and the correction value according to the light-transmitting angle is generated based on the shape information of the line-shaped laser beam. Thus, it is possible to accurately generate the shape distortion information of the line-shaped laser beam.

(4) In some embodiments, in the above configuration (3), the laser radar device further includes a far-field pattern observation optical system for observing a far-field pattern, the far-field pattern observation optical system being installed between the monitoring sensor and the branching device.

In the case of a semiconductor laser light source, the shape (irradiation pattern) of the line-shaped laser beam is different between immediately after the light source (near-field pattern) and a position away from the light source (far-field pattern).

With the above configuration (4), the far-field pattern observation optical system is installed between the monitoring sensor and the branching device. Thus, it is possible to generate the shape distortion information based on the shape of the line-shaped laser beam obtained through the far-field pattern observation optical system, to obtain a shape which is closer to the actual shape of the line-shaped laser beam in the measurement target area, and to generate the shape distortion information more accurately.

(5) In some embodiments, in any one of the above configurations (1) to (4), the received signal generation unit includes a light-receiver lens for receiving the reflected light reflected from the measurement target area, a line sensor array arranged downstream of the light-receiver lens and having a plurality of line sensor cells disposed along the first direction, and a light-receiver optical system for condensing the reflected light received by the light-receiver lens toward the line sensor array, the light-receiver optical system being arranged between the light-receiver lens and the line sensor array, and being configured such that a magnification at which the reflected light is condensed in the second direction is set higher than a magnification at which the reflected light is condensed in the first direction.

With the above configuration (5), the laser radar device includes the line sensor array having the plurality of line sensor cells disposed along the first direction, and the light-receiver optical system for condensing the reflected light received by the light-receiver lens toward the line sensor array, the light-receiver optical system being arranged between the light-receiver lens and the line sensor array, and being configured such that the magnification at which the reflected light is condensed in the second direction is set higher than the magnification at which the reflected light is condensed in the first direction. Thus, it is possible to keep the entire measurement target area within a sensor field of view of the line sensor array, and to implement scanless on the light-receiving side with a simple configuration.

(6) In some embodiments, in the above configuration (5), the three-dimensional information generation unit further includes an information generation unit for generating the three-dimensional information of the measurement target area from position information in the first direction which is acquired based on pixel information of the line sensor cells receiving the reflected light, the corrected position information in the second direction, and distance information in a third direction orthogonal to the first direction and the second direction, the distance information in the third direction being based on information on a distance to the measurement target area which is acquired from a light round-trip time from irradiation with the laser beam to reception of the laser beam by the line sensor array.

With the above configuration (6), it is possible to generate the three-dimensional information of the measurement target area based on the position information in the first direction, the corrected position information in the second direction, and the position information in the third direction.

(7) In some embodiments, in the above configuration (1) and (6), the shape distortion information is stored in a database formed in the storage unit.

With the above configuration (7), the three-dimensional information is generated by using the shape distortion information stored in the database. Thus, the laser radar device need not include the branching device, the monitoring sensor, and the like described above when the three-dimensional information is generated, making it possible to reduce the size of the laser radar device.

(8) A traveling body according to at least one embodiment of the present invention includes the laser radar device according to any one of the above configurations (1) to (7).

With the above configuration (8), the above-described laser radar device is mounted, for example, the traveling body such as a vehicle. Thus, it is possible to acquire three-dimensional information on a travel route of the traveling body and to support driving of the traveling body.

According to at least one embodiment of the present invention, a laser radar device is provided which is capable of generating three-dimensional information with higher accuracy.

DETAILED DESCRIPTION

Figure 1:
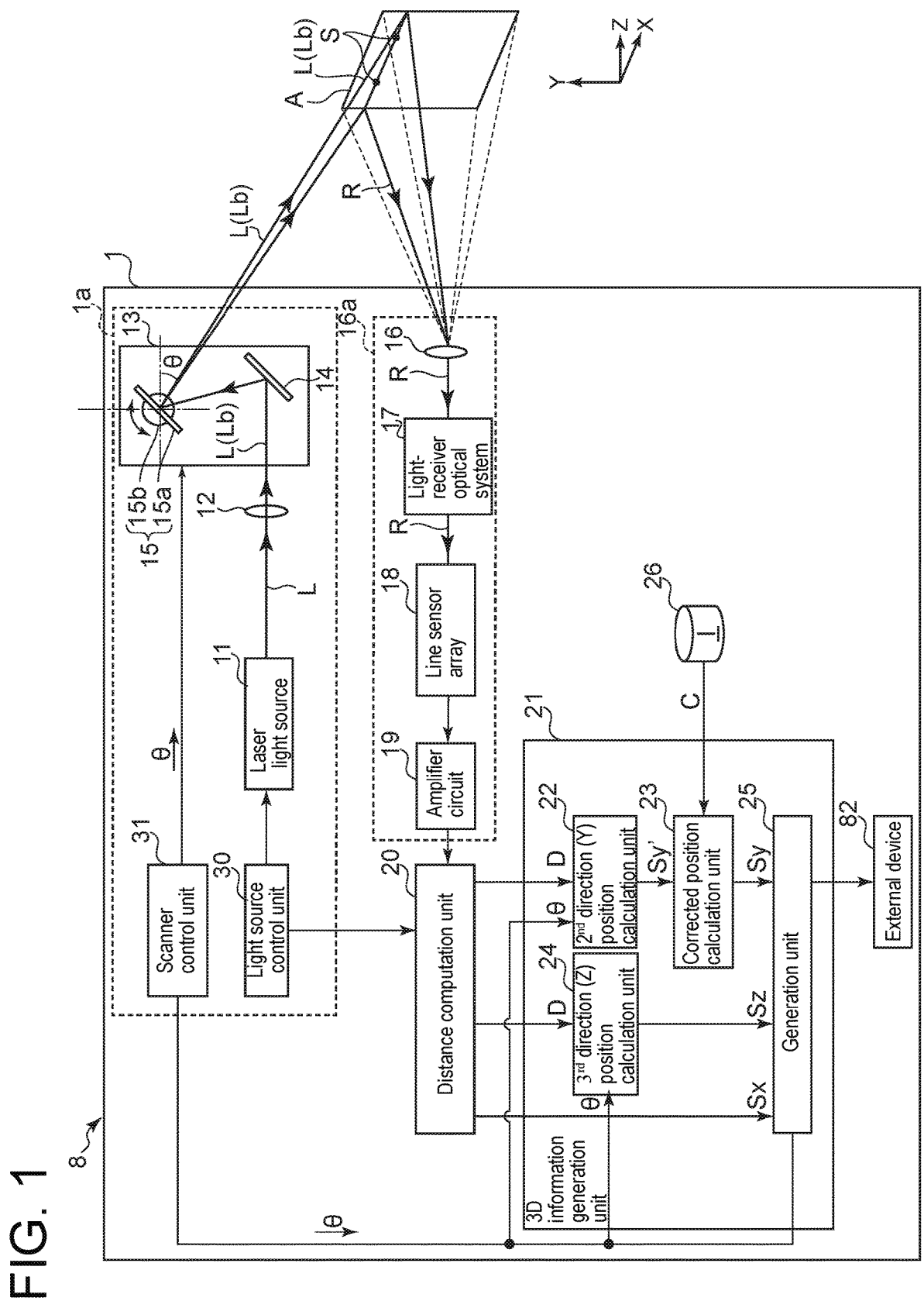
FIG. 1 is a schematic configuration diagram of a laser radar device according to an embodiment of the present invention.

Some embodiments of the present invention will now be described in detail with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a schematic configuration diagram of a laser radar device 1 according to an embodiment of the present invention. As shown in FIG. 1, the laser radar device 1 irradiates a predetermined measurement target area A set in advance such as an area set at a position at a predetermined distance with, for example, a line-shaped (linear) laser beam L (to be referred to as a line-shaped laser beam Lb hereinafter) extending in a horizontal direction (first direction) X while scanning the measurement target area A with the line-shaped laser beam Lb in a vertical direction (second direction) Y orthogonal to the horizontal direction X, and generates three-dimensional information of the measurement target area A upon receiving reflected light R of the line-shaped laser beam Lb.

The laser radar device 1 may be, for example, mounted frontward in a traveling direction of a vehicle (traveling body 8) such as a train running on a railway track. In this case, three-dimensional information of the measurement target area A which is set in the traveling direction of the vehicle and is updated as needed in accordance with traveling of the vehicle may be generated in real time or the like. Thus, it is possible to determine whether an obstacle exists in the traveling direction of the vehicle by using the generated three-dimensional information.

Figure 2:
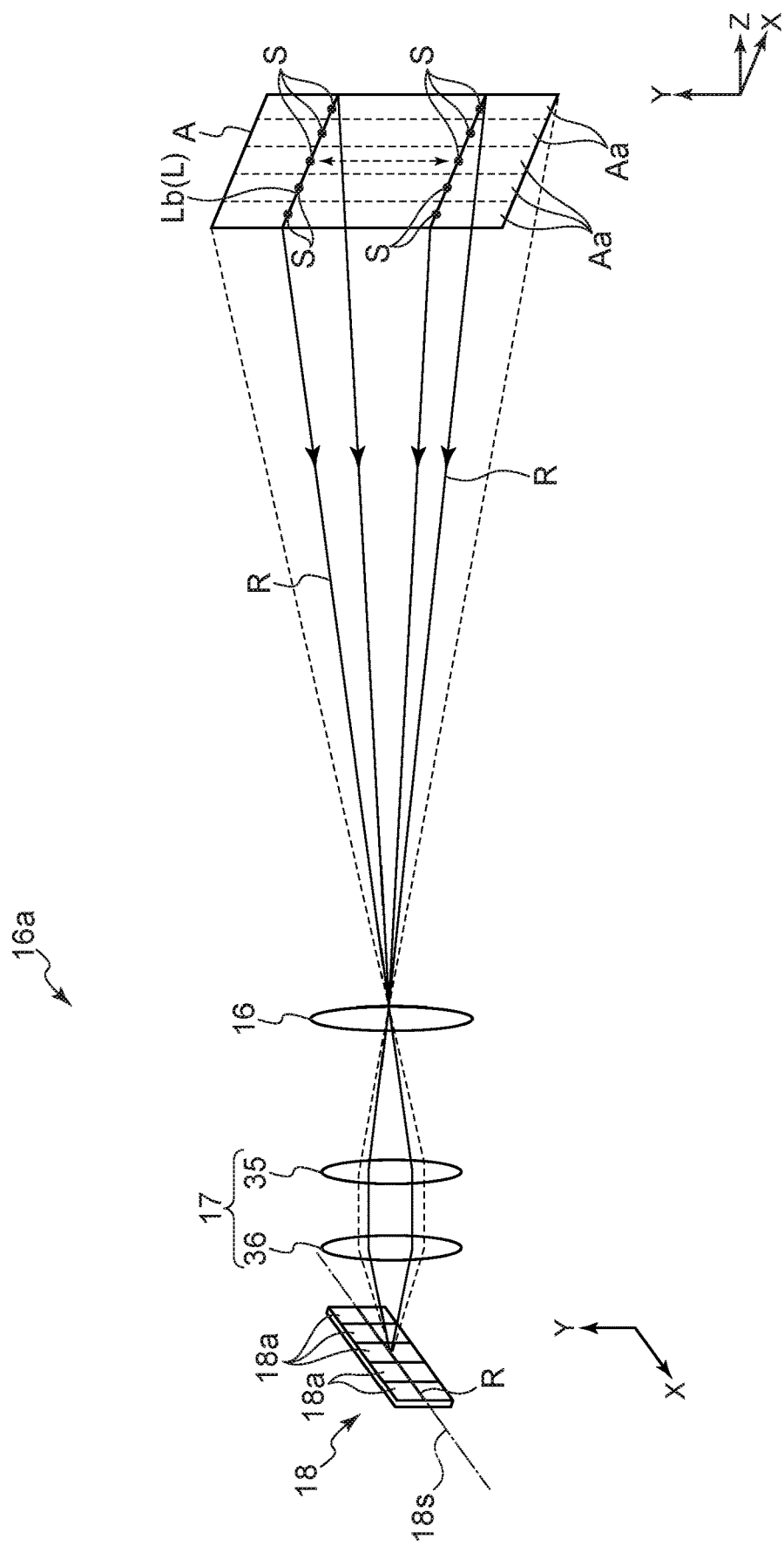
FIG. 2 is a schematic view showing a peripheral configuration including a light-receiver optical system according to an embodiment of the present invention.
Figure 3:
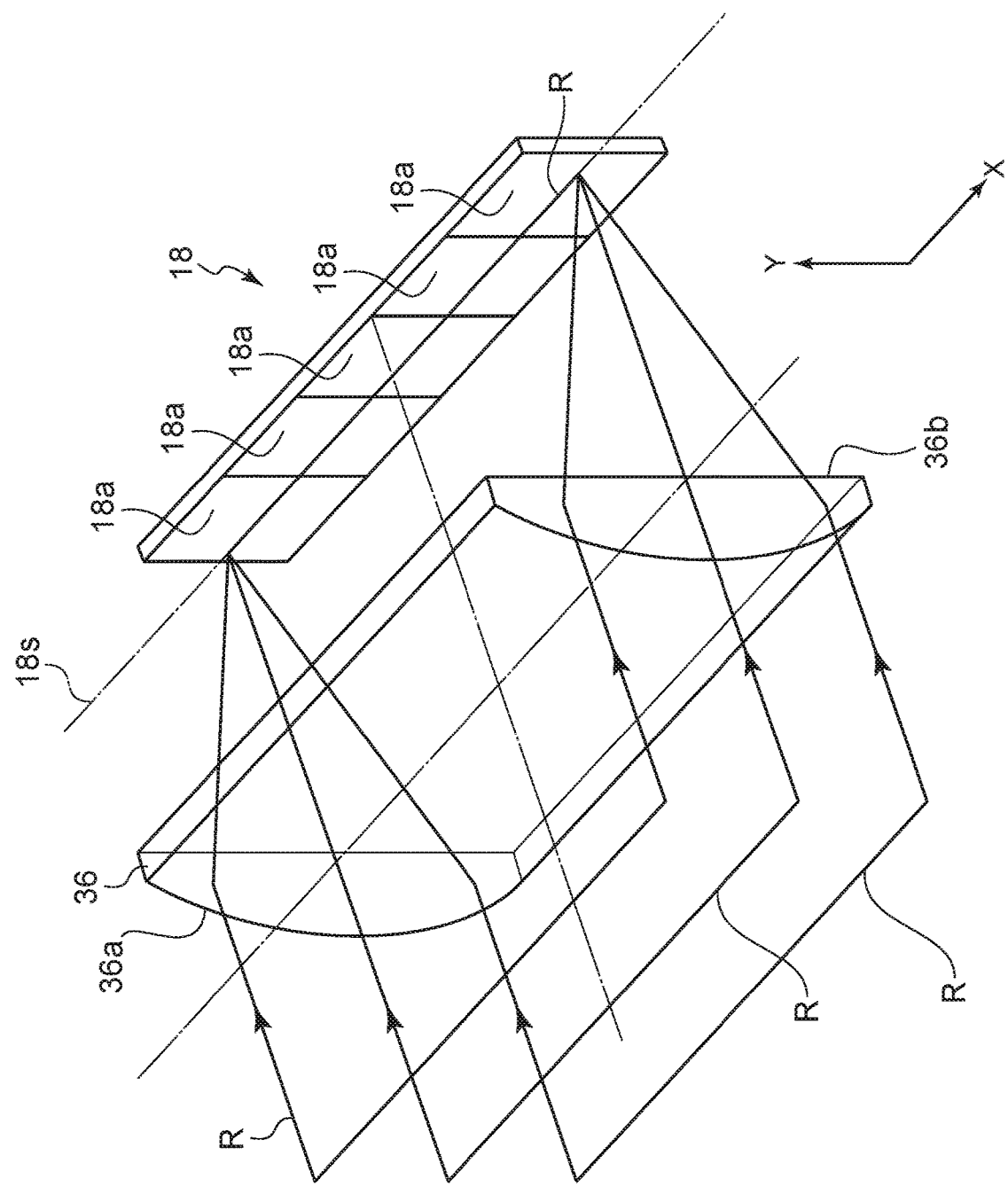
FIG. 3 is a perspective view showing the configuration of a condenser lens according to an embodiment of the present invention.
Figure 4:
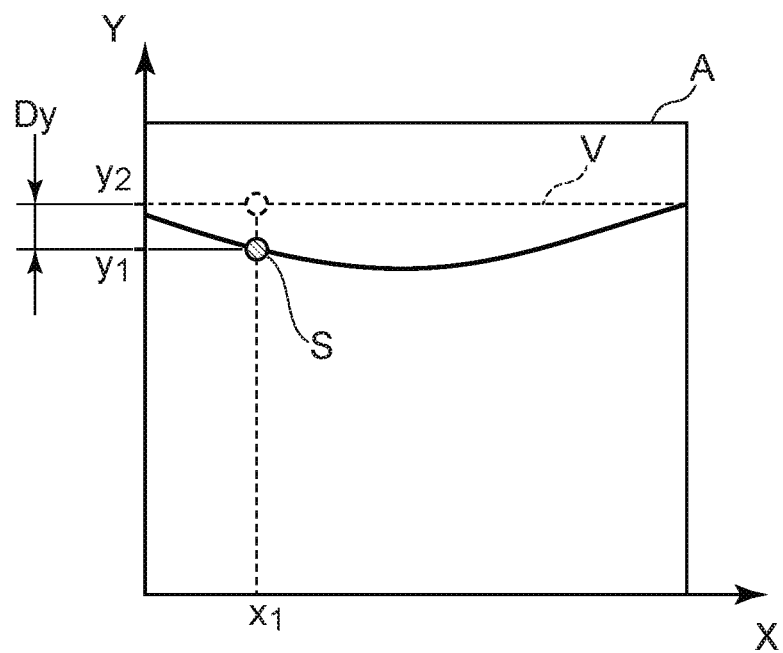
FIG. 4 is a graph exemplifying a distortion in the shape of a line-shaped laser beam according to an embodiment of the present invention, where a dashed line indicates an assumed shape, and a solid line indicates an actual shape of the line-shaped laser beam.

The above-described laser radar device 1 will be described in detail below with reference to FIGS. 1 to 4. FIG. 2 is a schematic view showing a peripheral configuration including a light-receiver optical system 17 according to an embodiment of the present invention. FIG. 3 is a perspective view showing the configuration of a condenser lens 36 according to an embodiment of the present invention. FIG. 4 is a graph exemplifying a distortion in the shape of the line-shaped laser beam Lb according to an embodiment of the present invention, where a dashed line indicates an assumed shape, and a solid line indicates an actual shape of the line-shaped laser beam Lb.

As shown in FIG. 1, the laser radar device 1 includes a scanner unit 1a for scanning the measurement target area A through irradiation with the line-shaped laser beam Lb, a received signal generation unit 16a, and a three-dimensional information generation unit 21. In the embodiment shown in FIG. 1, the laser radar device 1 further includes a distance computation unit 20. Each of the above-described configurations of the laser radar device 1 will be described by taking the embodiment shown in FIG. 1 as an example.

A description will be given below, provided that the first direction is the horizontal direction X, the second direction is the vertical direction Y, and the third direction orthogonal to the first direction and the second direction is a Z direction. However, the present invention is not limited to this, as long as the first direction, the second direction, and the third direction are orthogonal to each other. The three-dimensional information generation unit 21 and the distance computation unit 20 may each be composed of a computer including memories such as a ROM and a RAM, may each be operated through an operation (such as data computation) by a CPU according to a program instruction loaded into a memory (main storage device), and may each be composed of an integrated circuit.

The scanner unit 1a scans the measurement target area A along the vertical direction Y (second direction) orthogonal to the horizontal direction X (predetermined first direction) by irradiating the measurement target area A with the line-shaped laser beam Lb as a light-transmitting angle θ is changed. The line-shaped laser beam Lb is formed into a line shape so as to extend in the above-described horizontal direction X. In the embodiment shown in FIG. 1, the above-described scanner unit 1a includes a laser light source 11, a light-transmitter lens 12, and a movable scanner 13.

Describing the embodiment shown in FIG. 1 in detail, the laser light source 11 emits the laser beam L. For example, a laser beam with a wavelength of 200 to 2,000 nm is used as the laser beam L. In particular, in a case in which the laser radar device 1 is used in an outdoor wide space, it is possible to implement stable measurement by using a laser beam with a wavelength of 800 to 2,000 nm. The laser light source 11 may be composed of, for example, a laser diode or the like. In the present embodiment, the laser light source 11 emits the laser beam L in a pulse shape based on a light-emitting command of a light source control unit 30 for controlling the operation of the laser light source 11.

The light-transmitter lens 12 forms the laser beam L emitted from the laser light source 11 into a line shape so that the laser beam L extends in the predetermined horizontal direction X. For example, the light-transmitter lens 12 may be formed by a cylindrical convex lens or may be formed by a cylindrical concave lens. With such a configuration, it is possible to form the laser beam L emitted from the laser light source 11 into the line shape. In the present embodiment, the laser beam L is formed into the line shape extending in the horizontal direction X by adjusting the axial direction of the light-transmitter lens 12 to the horizontal direction X.

The movable scanner 13 is configured to scan the measurement target area A along the vertical direction Y by irradiating the measurement target area A with the laser beam L formed into the line shape by the above-described light-transmitter lens 12 (to be referred to as the line-shaped laser beam as needed hereinafter) as the light-transmitting angle θ is changed. The three-dimensional measurement rate with respect to the measurement target area A is improved by setting a scanning direction to the direction (Y) perpendicular to the direction (X) in which the line-shaped laser beam Lb extends, making it possible to measure the measurement target area A in short period of time.

More specifically, in the present embodiment, the movable scanner 13 includes a reflection mirror 14 reflecting the line-shaped laser beam Lb and a vertical scanning unit 15 for scanning the line-shaped laser beam Lb reflected by the reflection mirror 14 in the vertical direction Y. The reflection mirror 14 reflects the laser beam L formed into the line shape by the light-transmitter lens 12 onto the vertical scanning unit 15. The vertical scanning unit 15 is, for example, formed by a galvano scanner, and includes a galvano mirror 15a which is a plane mirror and a drive motor 15b for swinging the surface of the galvano mirror 15a. Then, the vertical scanning unit 15 drives the drive motor 15b to swing the galvano mirror 15a under control of a scanner control unit 31 for controlling the operation of the movable scanner 13.

The scanner control unit 31 controls the operation of the drive motor 15b based on a predetermined scanning pattern. Thus, it is possible to control the light-transmitting angle θ (the angle in the vertical direction Y) to the measurement target area A while irradiating the measurement target area A with the laser beam L reflected by the reflection mirror 14, enabling scanning the measurement target area A in the vertical direction Y. Then, the line-shaped laser beam Lb thus transmitted from the movable scanner 13 to the measurement target area A is reflected by the measurement target area A, and the reflected light R is processed by the received signal generation unit 16a to be described next.

However, the present invention is not limited to the embodiment shown in FIG. 1. In some other embodiments, the scanner unit 1a may include, without including the above-described movable scanner 13, a light source with a beam scanning function (mechaless scanner) such as an optical phased array capable of irradiating the measurement target area A with the laser beam as the light-transmitting angle θ is changed, and may further include the above-described light-transmitter lens 12. In some other embodiments, the scanner unit 1a may include, without including the light-transmitter lens 12, a light source such as a semiconductor laser capable of outputting the line-shaped laser beam Lb and may further include the movable scanner 13.

The received signal generation unit 16a receives the reflected light R of the line-shaped laser beam Lb, with which the measurement target area A is irradiated, and generates a received signal according to the reflected light R. More specifically, in the present embodiment, as shown in FIG. 2, the received signal generation unit 16a includes a light-receiver lens 16, a light-receiver optical system 17, and a line sensor array 18.

The light-receiver lens 16 receives the reflected light R reflected from each of reflection positions (to be referred to as measurement points S hereinafter) of the measurement target area A. As shown in FIG. 2, the line-shaped laser beam Lb has the line shape and is emitted in a certain line-shaped range of the measurement target area A, and thus the light-receiver lens 16 receives the reflected lights R from the plurality of measurement points S. Then, the light-receiver lens 16 forms images of the respective measurement points S at a predetermined position downstream of the light-receiver lens 16.

The light-receiver optical system 17 is an optical system for condensing the reflected lights R received by the light-receiver lens 16 in the vertical direction Y. In the present embodiment, the light-receiver optical system 17 includes a relay lens 35 arranged at the imaging position of the light-receiver lens 16 and a condenser lens 36 arranged downstream of the relay lens 35, as shown in FIG. 2. The relay lens 35 is formed by a convex lens and has a function of transmitting imaging information of the light-receiver lens 16 at the imaging position to the condenser lens 36 while holding the imaging information. As shown in FIG. 3, the condenser lens 36 is formed by a cylindrical convex lens having a curved surface 36a on an incident side of the reflected lights R and a flat surface 36b on an exist side of the reflected lights R. The condenser lens 36 may be a cylindrical convex lens having a flat surface on the incident side of the reflected lights R and a curved surface on the exist side of the reflected lights R. The condenser lens 36 is formed such that a magnification at which the reflected lights R are condensed in the vertical direction Y is higher than a magnification at which the reflected lights R are condensed in the horizontal direction X. That is, the condenser lens 36 condenses parallel pencils of the reflected lights R transmitted from the relay lens 35, that is, all the imaging information toward the line sensor array 18 in the vertical direction Y.

Thus, in the present embodiment, the light-receiver optical system 17 condenses the imaging information of the light-receiver lens 16 to the line sensor array 18 with a simple configuration in which the two types of lenses are combined. The light-receiver optical system 17 condenses the reflected light R from any and every measurement point S in the measurement target area A to the line sensor array 18, allowing entire divided areas Aa segmented in the measurement target area A to fall within a field of view of each line sensor cell 18a of the light-receiving line sensor 18. Thus, scanless on the light-receiving side is implemented.

The line sensor array 18 converts the received reflected lights R into an electrical signal. The line sensor array 18 includes the plurality of (five in the present embodiment) line sensor cells 18a disposed along the horizontal direction X and is configured such that a line sensor axis 18s extends in the horizontal direction X by arranging the line sensor cells 18a side by side in the horizontal direction X. Each of the line sensor cells 18a is formed by a photoelectric conversion element (for example, a photo diode) converting the received reflected light R into a current and is formed by a single element having a single pixel. Thus, it is possible to respond to the laser beam L of a short pulse.

Then, each pencil of the parallel pencils transmitted from the relay lens 35 is received by a corresponding one of the plurality of line sensor cells 18*a*, which is matched with the pencil in a position in the horizontal direction X. That is, the measurement target area A is segmented into the divided areas Aa as many as the line sensor cells 18*a* of the line sensor array 18, and the reflected lights R from the measurement target area A are spatially resolved by the same number as the line sensor cells 18*a* of the line sensor array 18 and are received by the line sensor cell 18*a* corresponding to the divided area Aa. In the embodiments shown in FIGS. 2 and 3, the number of line sensor cells 18*a* is five. Thus, the reflected lights R from the measurement target area A are spatially resolved into five in correspondence with the divided areas Aa and are received by the line sensor cell 18*a* corresponding to the divided area Aa. At this time, the reflected lights R from the divided areas Aa are condensed by the condenser lens 36 in the vertical direction Y. Thus, the parallel pencils of the reflected lights R from the measurement target area A, that is, all the imaging information is condensed to the line sensor array 18.

Moreover, the line sensor array 18 outputs a received signal which is based on the laser beam L included in the received reflected light R. In the present embodiment, the received signal generation unit 16*a* further includes an amplifier circuit 19. The amplifier circuit 19 amplifies the received signal output by the line sensor array 18 as a voltage signal. The received signal output by the line sensor array 18 is a weak current signal, and thus the amplifier circuit 19 converts the current signal into the voltage signal to output the converted signal to the distance computation unit 20.

The distance computation unit 20 computes, based on the input received signal, distance information D of the measurement points S in the measurement target area A and position information in the horizontal direction X of the measurement points S. In the present embodiment, the above-described light source control unit 30 includes a master clock of the laser radar device 1 and outputs a light-emitting synchronization signal of a pulse shape to the distance computation unit 20 at the same time as emission of the laser beam L. Then, the distance computation unit 20 receives the light-emitting synchronization signal of the pulse shape output from the light source control unit 30 and the received signal output from the received signal generation unit 16*a*, and computes a distance to each of the measurement points S in the measurement target area A irradiated with the laser beam L.

More specifically, the distance computation unit 20 measures a time (light round-trip time) from emission of (irradiation with) the laser beam L to reception of the reflected lights R by the line sensor array 18 based on the light-emitting synchronization signal and the received signal, and computes a distance to the measurement point S, at which the laser beam L is reflected, based on the measured time. That is, the distance is a distance by which the laser beam L has traveled (light-transmitting distance) and is obtained by a computation expression of $c \times t \div 2$, where c is a speed of the laser beam L, and t is a measurement time.

On the other hand, regarding the position information in the horizontal direction X described above, the distance computation unit 20 acquires pixel information (number) of the line sensor cells 18*a* receiving the reflected light R and computes, from the pixel information, the position information in the horizontal direction X of the measurement points S.

Then, the distance computation unit 20 outputs, to the three-dimensional information generation unit 21, information on the above-described light-transmitting distance (to be referred to as the distance information D) and the position information in the horizontal direction X of the measurement points S in the measurement target area A computed as described above. The distance computation unit 20 may output, together with the distance information D, a light-receiving intensity included in the received signal in association with the distance information D to a generation unit 25.

The three-dimensional information generation unit 21 generates the three-dimensional information of the measurement target area A based on the received signal output from the received signal generation unit 16*a* described above. In the present embodiment, upon generating the three-dimensional information, the three-dimensional information generation unit 21 acquires the position information in the horizontal direction X of the measurement points S from the above-described distance computation unit 20, and acquires position information Sy in the vertical direction Y and position information Sz in the Z direction through computation based on the distance information D input from the distance computation unit 20 and the light-transmitting angle θ (light-transmitting control angle) input from the above-described scanner control unit 31. That is, with a geometric method, it is possible to calculate the position information Sz in the Z direction by, for example, the above-described distance information D×cos θ.

On the other hand, a problem to be described next is caused by calculating the position information Sy in the vertical direction Y by, for example, the distance information D×sin θ. That is, it is presupposed that position coordinates in the vertical direction Y computed as described above have a linear shape and are parallel to the line sensor axis 18*s* when the measurement target area A is irradiated with the laser beam L (Lb) formed into the line shape. It is thus considered that a deviation occurs in the position coordinates in a scanning direction (the vertical direction Y in the present embodiment) of the generated three-dimensional information in a case in which the irradiation axis of the line-shaped laser beam Lb is oblique with respect to the line sensor axis 18*s*, in a case in which the linear shape of the line-shaped laser beam Lb is distorted such as curved (see FIG. 4), or the like.

For example, the laser beam L from the laser radar device 1 must have been formed in a straight line (assumed straight line V) extending in parallel to the horizontal direction X (the extending direction of the line sensor axis 18*s*) as indicated by the dashed line in FIG. 4. In reality, however, the laser beam L is curved as indicated by the solid line in FIG. 4. In this case, although a position in the horizontal direction X is the same (x1 of FIG. 4) between the solid line and the dashed line, an error Dy occurs with respect to the vertical direction Y. In this case, if the three-dimensional information generation unit 21 generates the three-dimensional information under the assumption that the measurement target area A is irradiated with the line-shaped laser beam Lb having a linear shape in the horizontal direction X as indicated by the dashed line in FIG. 4, the position information in the vertical direction Y of the measurement point S whose actual position coordinates in the vertical direction Y is y1 is calculated as y2. Therefore, in the case of the measurement point S shown in FIG. 4, the error Dy ($|y2-y1|$) occurs in the position coordinates of each of the measurement points S in the vertical direction Y of the generated three-dimensional information.

Moreover, the above-described error Dy in the vertical direction Y increases with distance from the movable scanner 13, and thus the error Dy changes in accordance with the position coordinates of the measurement point S in the Z direction. Accordingly, the error Dy increases as a distance to the surface of an object positioned in the measurement target area A (a distance in the Z direction) is large, decreasing the accuracy of the generated three-dimensional information. In addition, for example, the distorted shape such as the curved shape described above may vary from the one light-transmitting angle θ of the line-shaped laser beam Lb to another in a case in which there is a lens in the middle of irradiating the measurement target area A with the line-shaped laser beam Lb, for example. If the shape of the line-shaped laser beam Lb varies in accordance with the light-transmitting angle θ as described above, the magnitude of the error Dy is not uniform in accordance with the position coordinates in the vertical direction Y, further decreasing the accuracy of the generated three-dimensional information.

Thus, the laser radar device 1 of the present invention further includes a storage unit 26 capable of storing shape distortion information I of the line-shaped laser beam Lb in the vertical direction Y (second direction), in addition to the above-described configurations. Then, the above-described three-dimensional information generation unit 21 generates the three-dimensional information of the measurement target area A based on the corrected position information Sy in the vertical direction Y which is obtained by correcting the position information in the vertical direction Y calculated based on the light-transmitting angle θ and the received signal output from the received signal generation unit 16a, with the shape distortion information I.

More specifically, the above-described shape distortion information I may be composed of information on the error Dy determined with respect to an information set of the light-transmitting angle θ and a unit distance in the Z direction. That is, referring to the shape distortion information I, it is possible to obtain the error Dy at a position away by the unit distance in the Z direction with respect to the light-transmitting angle θ. Therefore, performing a computation to increase or decrease, based on the distance in the Z direction (the position information Sz in the Z direction), the error Dy thus obtained, it is possible to calculate a correction value C of correcting, to the actual position (y1 of FIG. 4), the position coordinates in the vertical direction Y (y2 of FIG. 4) which is calculated on the presupposition that the line-shaped laser beam Lb is in parallel to the line sensor axis 18s and is formed into the straight line (the assumed straight line V in FIG. 4). Thus, it is possible to calculate the correction value C appropriately in accordance with the position information Sz in the Z direction and to calculate the correction value C appropriately even in a case in which the correction value C depends on the position information in the horizontal direction X and the light-transmitting angle θ.

In the present embodiment, the three-dimensional information generation unit 21 includes a corrected position calculation unit 23 for acquiring the position information in the vertical direction Y (y2 of FIG. 4) of a reflection position (measurement point S) of the reflected light R from the measurement target area A, which is calculated based on the light-transmitting angle θ and the distance information D on a distance to the reflection position, and the correction value C (y1-y2 of FIG. 4) according to the distance information D and position information in the horizontal direction X (x1 of FIG. 4) of the reflection position, which is obtained based on the shape distortion information I stored in the storage unit 26, and for calculating the corrected position information Sy in the vertical direction Y (y1 of FIG. 4) based on the acquired position information in the vertical direction Y and the acquired correction value C.

More specifically, the three-dimensional information generation unit 21 includes a second direction position calculation unit 22 for calculating assumed second direction position coordinates S y' in the vertical direction Y (second direction) based on the distance information D and the light-transmitting angle θ. The above-described corrected position calculation unit 23 is connected to the second direction position calculation unit 22 and calculates the corrected position information Sy in the vertical direction Y by correcting the assumed second direction position coordinates Sy' input from the second direction position calculation unit 22, with the correction value C. In addition, the three-dimensional information generation unit 21 includes a third direction position calculation unit 24 for calculating the position information Sz in the Z direction based on the light-transmitting angle θ and the distance information D.

Then, the corrected position information Sy in the vertical direction Y calculated by the corrected position calculation unit 23 is input to the generation unit 25 of the three-dimensional information generation unit 21, together with the position information Sx in the horizontal direction X computed by the above-described distance computation unit 20 and the position information Sz in the Z direction calculated by the third direction position calculation unit 24. Thus, the generation unit 25 can acquire the position information Sx in the horizontal direction X, the position information Sy in the vertical direction Y, and the position information Sz in the Z direction for each of the measurement points S. That is, the generation unit 25 can acquire three-dimensional coordinate information of the measurement points S and generates the three-dimensional information of the measurement target area A from a coordinate information distribution of the plurality of measurement points S existing in the measurement target area A.

The three-dimensional information of the measurement target area A thus generated by the three-dimensional information generation unit 21 is transmitted to an external device 82 (for example, a computer of the vehicle or the like) by wire or wireless and is used by the external device 82.

However, the present invention is not limited to the present embodiment. The three-dimensional information generation unit 21 may generate the three-dimensional information based on the corrected position information Sy in the vertical direction Y, and may calculate the corrected position information Sy in the second direction by another method based on the distance information D, the light-transmitting angle θ, and the shape distortion information I, without undergoing an order of correcting the above-described assumed second direction position coordinates Sy' with the correction value C. Moreover, the distance computation unit 20 may calculate the position information Sz in the Z direction by configuring such that the light-transmitting angle θ is input to the distance computation unit 20. In this case, the third direction position calculation unit 24 can be omitted.

Moreover, in the above-described embodiment, the configuration using the galvano scanner is described as an example of the vertical scanning unit 15. However, the present invention is not limited to this configuration and, for example, a polygon scanner including a polygon mirror may be used. Moreover, in a configuration where the vertical scanning unit 15 can be arranged on the optical axis of the light-transmitter lens 12, the reflection mirror 14 may not be provided. FIG. 2 shows the configuration with the one relay lens 35 and the one condenser lens 36. However, a lens unit obtained by combining a plurality of relay lenses 35 and a plurality of condenser lenses 36 may be provided, as a matter of course. Moreover, in the present embodiment, the relay lens 35 is arranged at the imaging position of the light-receiver lens 16. However, the present invention is not limited to this, and the relay lens 35 may be arranged in the vicinity of or behind the imaging position of the light-receiver lens 16.

With the above configuration, the three-dimensional information of the measurement target area A is generated based on the corrected position information Sy in the second direction (for example, the vertical direction Y), which is obtained by correcting, with the shape distortion information I, the position information (assumed position information) in the second direction obtained by, for example, the geometric method or the like based on the light-transmitting angle θ, to the measurement target area A, of the laser beam formed into the line shape (line-shaped laser beam Lb) in the first direction (for example, the horizontal direction X) and the signal (received signal) of the reflected light R from the reflection position (measurement point S) in the measurement target area A.

Thus, it is possible to accurately generate the three-dimensional information of the measurement target area A by using the corrected position information Sy in the second direction, even if a deviation from the assumed position occurs in a position of the shape of the line-shaped laser beam Lb in the second direction when the measurement target area A is irradiated with the line-shaped laser beam Lb in a case in which the shape of the laser beam L (or seed light) to be formed into the linear shape by the scanner unit 1*a* such as the light-transmitter lens 12 is not actually formed into the assumed linear shape but is distorted, or in a case in which the linear shape is inclined more than assumed due to the inclination of the irradiation axis of the laser beam L, for example.

Figure 5:
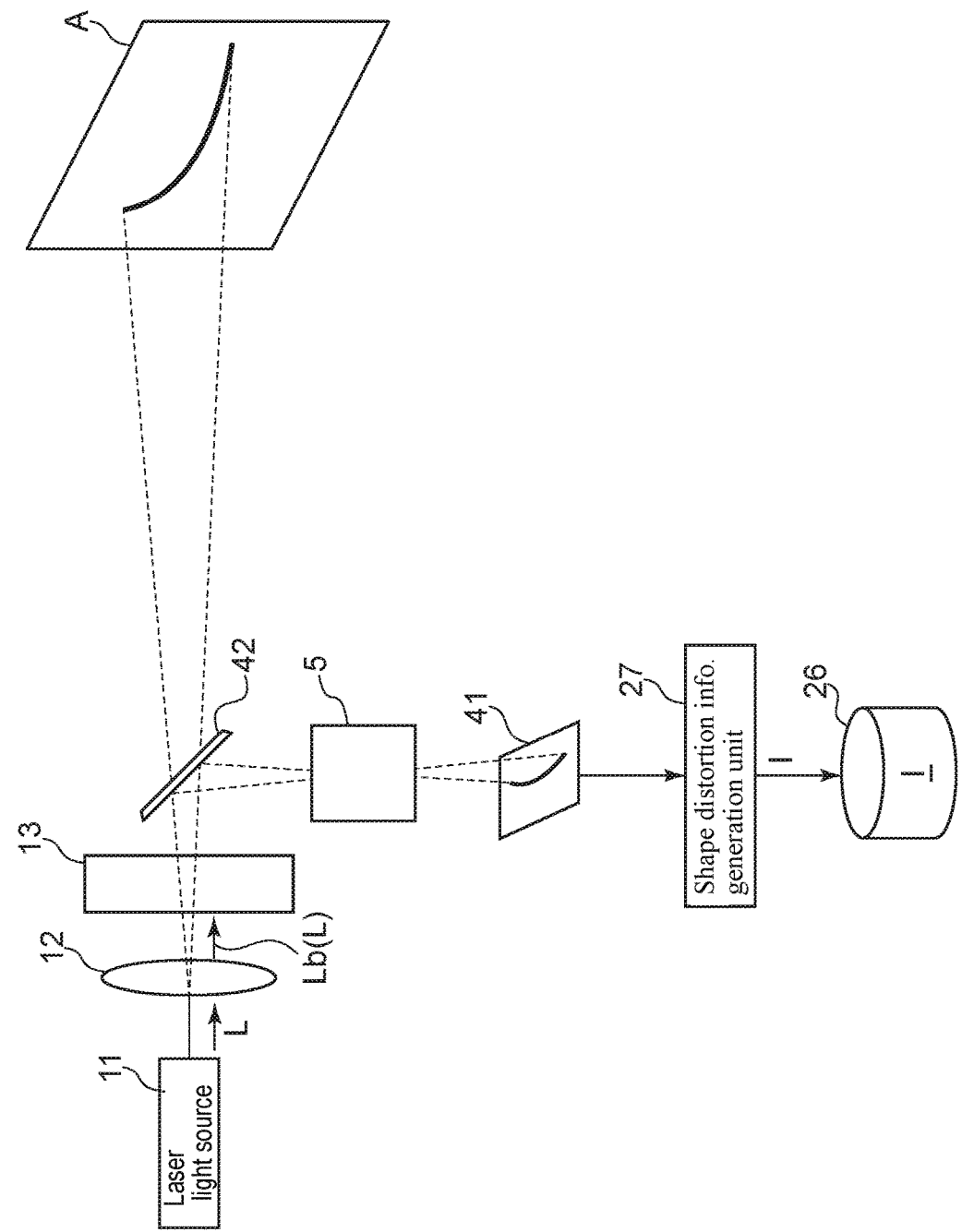
FIG. 5 is a view showing a configuration for generating shape distortion information according to an embodiment of the present invention.
Figure 6:
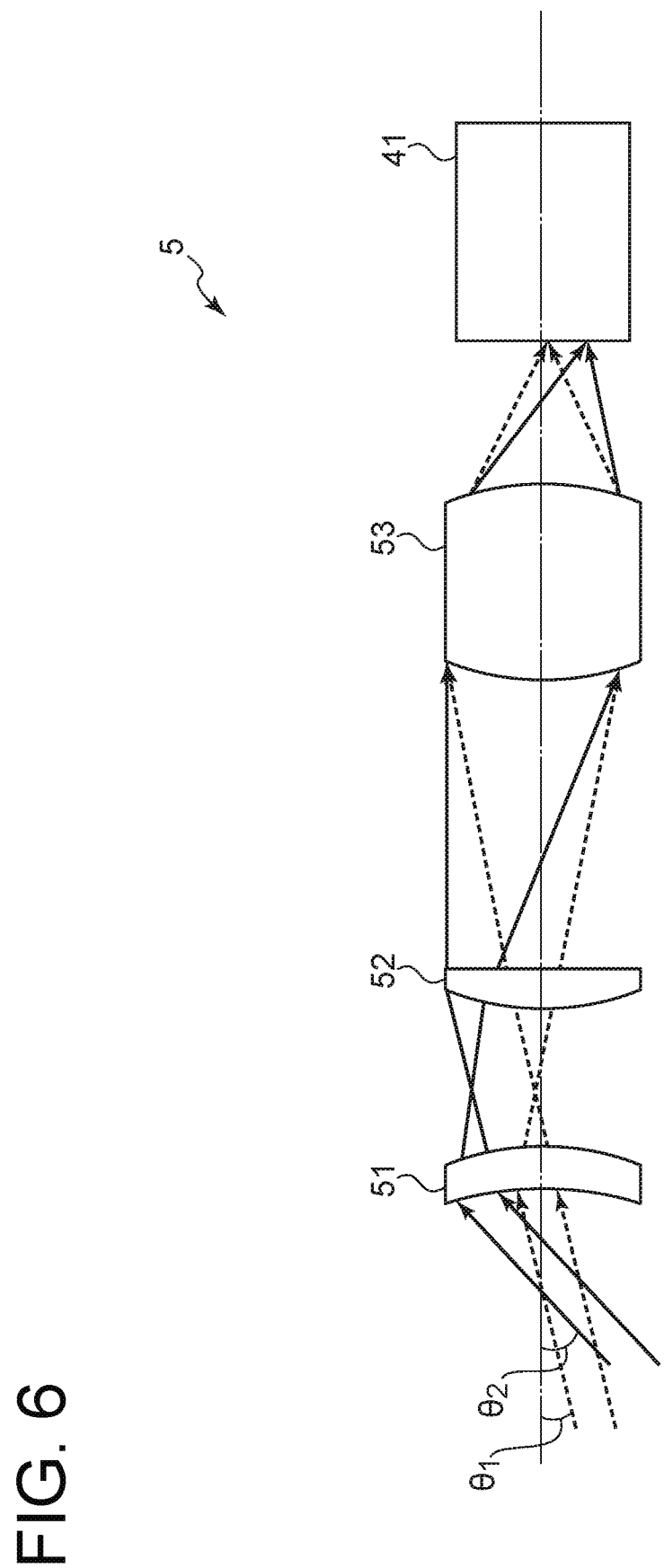
FIG. 6 is a view showing a far-field pattern observation optical system according to an embodiment of the present invention.

A method of generating the above-described shape distortion information I will be described next with reference to FIGS. 5 and 6. FIG. 5 is a view showing a configuration for generating the shape distortion information I according to an embodiment of the present invention. Furthermore, FIG. 6 is a view showing a far-field pattern observation optical system 5 according to an embodiment of the present invention.

In some embodiments, as shown in FIG. 5, the laser radar device 1 further includes a monitoring sensor 41, a branching device 42, and a shape distortion information generation unit 27. The monitoring sensor 41 receives the line-shaped laser beam Lb. The branching device 42 branches, to the above-described monitoring sensor 41, the line-shaped laser beam Lb emitted from the movable scanner 13 or the like toward the measurement target area A. The shape distortion information generation unit 27 generates, based on the shape of the line-shaped laser beam Lb received by the above-described monitoring sensor 41, the shape distortion information I for obtaining, for example, the position information in the horizontal direction X and the above-described correction value C according to the above-described distance information D. In the embodiment shown in FIG. 5, the branching device 42 is installed between the movable scanner 13 and the measurement target area A. However, in some other embodiments, the branching device 42 may be installed at another position, in which the laser beam L has the line shape, between, for example, the light-transmitter lens 12 and the movable scanner 13 (the reflection mirror 14 or the like).

The above-described monitoring sensor 41 is an imaging element, and may be an image sensor such as a CCD or a CMOS. Then, the line-shaped laser beam Lb branched by the branching device 42 is imaged on a light-receiving surface of the monitoring sensor 41, and the monitoring sensor 41 converts the received line-shaped laser beam Lb into an electrical signal, thereby acquiring the shape information thereof. Then, the shape distortion information generation unit 27 converts the electrical signal input from the monitoring sensor 41 into data, thereby generating the shape distortion information I to be stored in the above-described storage unit 26.

That is, a monitor system for monitoring the actual shape of the line-shaped laser beam Lb is configured by using the branching device 42 and the monitoring sensor 41. Then, the above-described shape distortion information I is generated by measuring, through image processing, the error Dy between the actual shape of the line-shaped laser beam Lb obtained by the monitoring system, and the straight line passing through the position in the vertical direction Y assumed in accordance with the light-transmitting angle θ and is parallel to the horizontal direction X. Then, the shape distortion information I generated by the shape distortion information generation unit 27 is stored in the above-described storage unit 26, and thus can be used by the three-dimensional information generation unit 21.

At this time, it may be uncertain whether the actual line-shaped laser beam Lb passes through the assumed second direction position coordinates Sy' and is positioned on either one of the upper side or the lower side of the assumed straight line V (see FIG. 4) parallel to the horizontal direction X. For example, in a case in which the corrected position information Sy in the vertical direction Y is computed by a computation expression of Sy=Sy'+C, it is possible to appropriately calculate the corrected position information Sy by providing the correction value C with a minus sign if the actual measurement point S is positioned below the assumed straight line V as shown in FIG. 4. However, it is impossible to appropriately calculate the corrected position information Sy in the vertical direction Y, if the measurement point S is actually positioned above the assumed straight line V. Thus, for example, it is possible to appropriately determine the sign of the correction value C by measuring the shape of the line-shaped laser beam Lb formed into the line shape after confirming the position of the assumed second direction position coordinates Sy' by causing the monitoring sensor 41 to receive the laser beam L which is not formed into the line shape.

If the above-described laser light source 11 is a semiconductor laser light source of, for example, a surface-emitting laser, the shape (irradiation pattern) of the line-shaped laser beam Lb is different between immediately after the light source (near-field pattern) and a position away from the light source (far-field pattern).

Thus, in some embodiments, as shown in FIGS. 5 and 6, the laser radar device 1 may further include the far-field pattern observation optical system 5 for observing the far-field pattern, which is installed between the monitoring sensor 41 and the branching device 42. In the embodiments shown in FIGS. 5 and 6, the far-field pattern observation optical system 5 is configured by disposing, side by side, an f-θ lens 51, a field lens 52, and a relay lens 53 from the side of the branching device 42 toward the side of the monitoring sensor 41. Then, the line-shaped laser beam Lb is transmitted from the relay lens 53 to the monitoring sensor 41.

With the above configuration, the far-field pattern observation optical system 5 is installed between the monitoring sensor 41 and the branching device 42. Thus, it is possible to generate the shape distortion information I based on the shape of the line-shaped laser beam Lb obtained through the far-field pattern observation optical system 5, to obtain a shape which is closer to the actual shape of the line-shaped laser beam Lb in the measurement target area A, and to generate the shape distortion information I more accurately.

Moreover, in some embodiments, the above-described monitor system may be configured to generate the three-dimensional information while generating the shape distortion information I by the shape distortion information generation unit 27 and storing the shape distortion information I in the storage unit 26, as well as monitoring the actual shape of the line-shaped laser beam Lb. Thus, it is possible to generate the three-dimensional information without generating the shape distortion information I in advance.

In some other embodiments, the shape distortion information I may be generated by the above-described monitor system before the laser radar device 1 generates the three-dimensional information, and may be stored in the storage unit 26 as a database. In this case, the three-dimensional information is generated by using the shape distortion information I stored in the database. Thus, the laser radar device 1 need not include the branching device 42, the monitoring sensor 41, and the like described above when the three-dimensional information is generated, making it possible to reduce the size of the laser radar device.

The present invention is not limited to the above-described embodiments, and also includes an embodiment obtained by modifying the above-described embodiments and an embodiment obtained by combining these embodiments as appropriate.

The invention claimed is:

1. A laser radar device comprising:
   a scanner configured to scan a measurement target area along a second direction orthogonal to a predetermined first direction by irradiating the measurement target area with a line-shaped laser beam as a light-transmitting angle is changed, the line-shaped laser beam being a laser beam formed into a line shape so as to extend in the first direction;
   a received signal generation unit configured to generate a received signal according to received reflected light of the line-shaped laser beam with which the measurement target area is irradiated;
   a storage unit configured to store shape distortion information of the line-shaped laser beam in the second direction; and
   a three-dimensional information generation unit configured to generate three-dimensional information of the measurement target area based on corrected position information in the second direction which is obtained by correcting position information in the second direction calculated based on the received signal and the light-transmitting angle, with the shape distortion information,
   wherein the three-dimensional information generation unit includes a corrected position calculation unit configured to acquire position information in the second direction of a reflection position of the reflected light from the measurement target area, which is calculated based on the light-transmitting angle and distance information of a distance to the reflection position, and a correction value according to the distance information and position information in the first direction of the reflection position, which is obtained based on the shape distortion information stored in the storage unit, and configured to calculate the corrected position information in the second direction based on the acquired position information in the second direction and the acquired correction value.

2. The laser radar device according to claim 1, further comprising:
   a monitoring sensor for receiving the line-shaped laser beam;
   a branching device configured to branch the line-shaped laser beam to the monitoring sensor, the line-shaped laser beam being emitted from the scanner toward the measurement target area; and
   a shape distortion information generation unit configured to generate the shape distortion information based on a shape of the line-shaped laser beam received by the monitoring sensor.

3. The laser radar device according to claim 2, further comprising a plurality of lenses configured to observe a far-field pattern, the plurality of lenses being installed between the monitoring sensor and the branching device.

4. The laser radar device according to claim 1,
   wherein the received signal generation unit includes:
   a light-receiver lens configured to receive the reflected light reflected from the measurement target area;
   a line sensor array arranged downstream of the light-receiver lens and having a plurality of line sensor cells disposed along the first direction; and
   a plurality of lenses configured to condense the reflected light received by the light-receiver lens toward the line sensor array, the plurality of lenses being arranged between the light-receiver lens and the line sensor array, and being configured such that a magnification at which the reflected light is condensed in the second direction is set higher than a magnification at which the reflected light is condensed in the first direction.

5. The laser radar device according to claim 4,
   wherein the three-dimensional information generation unit further includes an information generation unit configured to generate the three-dimensional information of the measurement target area from:
   position information in the first direction which is acquired based on pixel information of the line sensor cells receiving the reflected light;
   the corrected position information in the second direction; and
   distance information in a third direction orthogonal to the first direction and the second direction, the distance information in the third direction being based on information on a distance to the measurement target area which is acquired from a light round-trip time from irradiation with the laser beam to reception of the laser beam by the line sensor array.

6. The laser radar device according to claim 1,
   wherein the shape distortion information is stored in a database formed in the storage unit.

7. A traveling body comprising the laser radar device according to claim 1.

8. A laser radar measurement method comprising:
   scanning a measurement target area along a second direction orthogonal to a predetermined first direction by irradiating the measurement target area with a line-shaped laser beam as a light-transmitting angle is changed, the line-shaped laser beam being a laser beam formed into a line shape so as to extend in the first direction;

generating a received signal according to received reflected light of the line-shaped laser beam with which the measurement target area is irradiated;

storing shape distortion information of the line-shaped laser beam in the second direction; and generating three-dimensional information of the measurement target area based on corrected position information in the second direction which is obtained by correcting position information in the second direction calculated based on the received signal and the light-transmitting angle, with the shape distortion information, wherein the generating of the three-dimensional information includes acquiring position information in the second direction of a reflection position of the reflected light from the measurement target area, which is calculated based on the light-transmitting angle and distance information of a distance to the reflection position, acquiring a correction value according to the distance information and position information in the first direction of the reflection position, which is obtained based on the shape distortion information stored in the storage unit, and calculating corrected position information in the second direction based on the acquired position information in the second direction and the acquired correction value.

9. A computer-readable non-transitory storage medium storing a laser radar measurement program for causing a computer to execute a method comprising:

scanning a measurement target area along a second direction orthogonal to a predetermined first direction by irradiating the measurement target area with a line-shaped laser beam as a light-transmitting angle is changed, the line-shaped laser beam being a laser beam formed into a line shape so as to extend in the first direction;

generating a received signal according to received reflected light of the line-shaped laser beam with which the measurement target area is irradiated;

storing shape distortion information of the line-shaped laser beam in the second direction; and generating three-dimensional information of the measurement target area based on corrected position information in the second direction which is obtained by correcting position information in the second direction calculated based on the received signal and the light-transmitting angle, with the shape distortion information, wherein the generating of the three-dimensional information includes acquiring position information in the second direction of a reflection position of the reflected light from the measurement target area, which is calculated based on the light-transmitting angle and distance information of a distance to the reflection position, acquiring a correction value according to the distance information and position information in the first direction of the reflection position, which is obtained based on the shape distortion information stored in the storage unit, and calculating corrected position information in the second direction based on the acquired position information in the second direction and the acquired correction value.

* * * * *